US011519231B2

(12) United States Patent
Ramjit et al.

(10) Patent No.: US 11,519,231 B2
(45) Date of Patent: Dec. 6, 2022

(54) DEGAUSSING FERROUS MATERIAL WITHIN DRILLING FLUIDS

(71) Applicant: ConocoPhillips Company, Houston, TX (US)

(72) Inventors: Avinash L. Ramjit, Houston, TX (US); Alexander B. Bowen, Mossy Rock, WA (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 16/254,186

(22) Filed: Jan. 22, 2019

(65) Prior Publication Data
US 2019/0226289 A1     Jul. 25, 2019

Related U.S. Application Data

(60) Provisional application No. 62/620,187, filed on Jan. 22, 2018.

(51) Int. Cl.
| | |
|---|---|
| *E21B 21/06* | (2006.01) |
| *E21B 47/12* | (2012.01) |
| *G01N 27/80* | (2006.01) |
| *G01V 3/28* | (2006.01) |
| *G01N 27/74* | (2006.01) |
| *E21B 21/12* | (2006.01) |

(52) U.S. Cl.
CPC .............. *E21B 21/06* (2013.01); *E21B 21/12* (2013.01); *E21B 47/12* (2013.01); *G01N 27/74* (2013.01); *G01N 27/80* (2013.01); *G01V 3/28* (2013.01)

(58) Field of Classification Search
CPC ........... E21B 21/06; E21B 21/12; E21B 47/12
See application file for complete search history.

(56) References Cited

U.S. PATENT DOCUMENTS

| | | | | |
|---|---|---|---|---|
| 2,987,822 | A * | 6/1961 | Arps ....................... | E21B 47/04 33/736 |
| 9,879,490 | B2 | 1/2018 | Edbury et al. | |
| 11,231,780 | B2 * | 1/2022 | Battlogg ................ | B60K 35/00 |
| 2006/0170425 | A1 * | 8/2006 | Kruspe ................... | E21B 47/00 324/368 |
| 2007/0138103 | A1 * | 6/2007 | Klatt ..................... | B03C 1/0332 210/695 |
| 2009/0015254 | A1 * | 1/2009 | Castillo .................. | E21B 47/00 324/303 |
| 2009/0037110 | A1 | 2/2009 | Holmes | |

(Continued)

FOREIGN PATENT DOCUMENTS

WO     2015147788     10/2015

OTHER PUBLICATIONS

Vipulanandan, C. et al., Smart Bentonite Drilling uds Modified with Iron Oxide Nanoparticles and Characterized Based on the Electrical Resistivity and Rheological Properties with Varying Magnetic Field Strengths and Temperatures, Offshore Technology Conference, OTC-27626-MS (2017).

(Continued)

*Primary Examiner* — Blake Michener
*Assistant Examiner* — Neel Girish Patel
(74) *Attorney, Agent, or Firm* — Boulware & Valoir, PLLC

(57) ABSTRACT

During a drilling operation, drilling mud is degaussed to remove magnetic interference that may disrupt measurements.

10 Claims, 3 Drawing Sheets

(56) References Cited

U.S. PATENT DOCUMENTS

| | | | | |
|---|---|---|---|---|
| 2013/0333872 | A1* | 12/2013 | Mcmillon | H01F 7/04 |
| | | | | 166/66.5 |
| 2015/0276969 | A1 | 10/2015 | Donderici et al. | |
| 2017/0285208 | A1 | 10/2017 | Castillo et al. | |
| 2017/0322013 | A1 | 11/2017 | Ridgway et al. | |
| 2018/0178261 | A1* | 6/2018 | Perkins | G01N 21/15 |
| 2018/0267197 | A1* | 9/2018 | Li | G01V 3/32 |
| 2020/0041681 | A1* | 2/2020 | Moss | E21B 41/00 |
| 2021/0285301 | A1* | 9/2021 | Maher | E21B 37/00 |
| 2021/0351555 | A1* | 11/2021 | Chen | G02B 6/4208 |

OTHER PUBLICATIONS

Williamson, D., Drilling Fluid Basics, Oilfield Review, Spring 2013: 25(1) (2013).
Internal Search Report for PCT/US19/014582 dated Mar. 14, 2019, 4 pages.
Magnostar (MSTAR), Specialized Tools, Mi SWACO 2009.

* cited by examiner

DEGAUSSING FERROUS MATERIAL WITHIN DRILLING FLUIDS

CROSS-REFERENCE TO RELATED APPLICATIONS

This application is a non-provisional application which claims benefit under 35 USC § 119(e) to U.S. Provisional Application Ser. No. 62/620,187 filed Jan. 22, 2018, entitled "DEGAUSSING FERROUS MATERIAL WITHIN DRILLING FLUIDS," which is incorporated herein in its entirety.

STATEMENT REGARDING FEDERALLY SPONSORED RESEARCH

None.

FIELD OF THE INVENTION

The present invention relates generally to drilling while logging, measurement while drilling, and the like. During a drilling operation, drilling mud is degaussed to remove magnetic interference that may disrupt measurements.

BACKGROUND OF THE INVENTION

Drilling fluids, often referred to as drilling mud, serve many functions including controlling formation pressures, removing cuttings from the well bore, cooling and lubricating the bit, and maintaining well stability. The composition of the drilling fluids vary dependent upon the formation conditions, rig capabilities, environmental regulations, type of drilling and other factors. Drilling fluids are designed to control subsurface pressure, minimize formation damage, minimize lost circulation, control erosion, optimize drill rates and penetration, as well as removing cuttings (Williamson, 2013).

The fluid circulating system is a series of components designed to maintain well bore stability while removing cuttings from the drill face. A generic fluid circulating system is shown in FIG. 1 but it may contain a variety of different components and configurations dependent upon the rig, the operator, the service provider or providers, well type, and the type of drilling. A major function of the fluid-circulating system is to remove the rock cuttings from the hole as drilling progresses. The drilling fluid is most commonly a suspension of clay and other materials in water and is called drilling mud. Drilling fluids are used in the rotary drilling process to clean the rock fragments from beneath the bit and carry them to the surface, exert sufficient hydrostatic pressure against subsurface formations to prevent formation fluids from flowing into the well, keep the newly drilled borehole open until steel casing can be cemented in the hole, and cool and lubricate the rotating drillstring and bit.

Types of drilling fluids include non-water base synthetic fluids such as diesel oil or mineral oil, water base colloidal clay such as clay, polymer, and combinations thereof, as well as pneumatic dry gas fluids which form a mist, foam, or gasified mud. Muds have progressed over the years and may contain many different materials. Some recent muds have been modified with iron oxide to provide unique electrical and rheological properties (Vipulanandan, 2017).

Measurement-while-drilling (MWD) systems measure, record, and transmit to the surface drilling and logging data in real time. The logging data (LWD) is used in calculations similar to those done with wireline logging data. Obtaining the data while drilling has many advantages over wireline techniques. Additionally, measurement while drilling is essential many geosteering techniques used in today's precise multidirectional wells. MWD technology records drilling and formation data. It is best suited for making measurements in deviated holes where wireline tools may not be able to traverse the entire drilled interval. Obtaining the data during drilling makes it possible to use it in the optimization of drilling practices and selection of coring and logging points. Unlike wireline measurements, MWD logs usually are obtained before significant invasion occurs. The recorded resistivity, therefore, is closer to true formation resistivity. This technology is still developing. Reliability is improving and tools are regularly modified.

Unfortunately, MWD systems may not accurately record positional data if materials in the drilling fluid shield or interfere with sensitive geosteering mechanisms. As wells become longer and more complex, initial errors that may be small could be propagated as drilling continues. A scale factor error may occur where the drilled well bore may progressively deviate from the desired well bore. The final well bore may be off by great distances before drilling is complete. One source of error may be shielding caused by ferrous materials in the drilling fluids. Recycled fluids contain magnetizable materials including materials in the mud, drill cuttings, and material from the formation. Previous attempts to remove magnetizable material from the drilling mud have included strong magnets, filtering, and replacing the drilling fluid.

An apparatus and method for removing magnetic interference from drilling fluids are required.

BRIEF SUMMARY OF THE DISCLOSURE

The invention more particularly includes demagnetizing well fluid to improve measurements in a well bore. A demagnetization apparatus for coupling to a well pipe is provided, the demagnetization unit having a demagnetizer or degausser that can be attached to a well pipe. The demagnetizing unit configured to demagnetize well fluid as it passes through a pipe as it is conveyed to the well bore.

In one embodiment, a process for drilling a well bore includes installing a demagnetization unit in a fluid circulation system; circulating drilling fluid; demagnetizing the circulating drilling fluid; and obtaining one or more measurements using the demagnetized drilling fluid.

In another embodiment, a demagnetization unit for a fluid circulation system is a pipe with a degaussing coil, the pipe having union fittings to be inserted within the drilling fluid circulation system.

In another embodiment, a process for drilling a well bore by installing a degaussing unit in a fluid circulation system, the degaussing unit having a first union; a pipe; a degaussing coil around said pipe; and a second union; circulating drilling fluid; degaussing the circulating drilling fluid; and obtaining one or more sensitive measurements.

In another embodiment, a system for drilling a well bore is described having a processor, a magnetometer, a demagnetization unit, and a fluid circulation system with a drilling fluid, the magnetometer measuring the magnetism of the drilling fluid and the degaussing unit degaussing the drilling fluid if the magnetic flux is above a threshold value.

In one embodiment, magnetically sensitive measurements may be identified beforehand including the magnetically sensitive measurement location and time, calculating the time prior to said measurement required for a volume of drilling fluid to reach the location of the sensitive measurement, and degaussing the drilling fluid during the measurement.

In another embodiment the demagnetization unit may be installed at a variety of locations including between the bell nipple and the shaker tank, the mud pit and the suction tank, the shaker tank and the suction tank, the suction tank and the mud pump, the mud pump and the stand pipe, the stand pipe and the kelly, the kelly and the top drive, within the drill pipe, above the bottom hole assembly, or at a combination of locations.

The demagnetization unit may be a demagnetizer, a degausser, or a pulse degausser. Additionally, the demagnetization unit may be permanently or temporarily installed. The demagnetization unit may be operated if the magnetic flux in the drilling fluid is above a threshold value such as 0.1 Gauss, 0.2 Gauss, 0.3 Gauss, 0.4 Gauss, 0.5 Gauss, or 1 Gauss.

As used herein "magnetometer" refers to a device that measures magnetic flux density B (in units of Tesla or As/m$^2$). A magnetometer may be a single sensor for measuring magnetic field or a system which uses one or more sensors.

As used herein a "demagnetizer" refers to a device that removes magnetic charge. Demagnetizers include coil degaussers, pulse degaussers, and magnetic demagnetizers. Coil degaussers use a coil of wire to create an alternating electromagnetic field, because the strong magnetic field alternates, it removes any magnetic charge in the passing fluid. Pulse degaussers, also referred to as capacitive discharge degaussers, use a capacitor and coil to create a burst electromagnetic pulse. Permanent magnet devices or electromagnetic demagnetizers use a strong magnetic field to create irregular magnetic moments.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
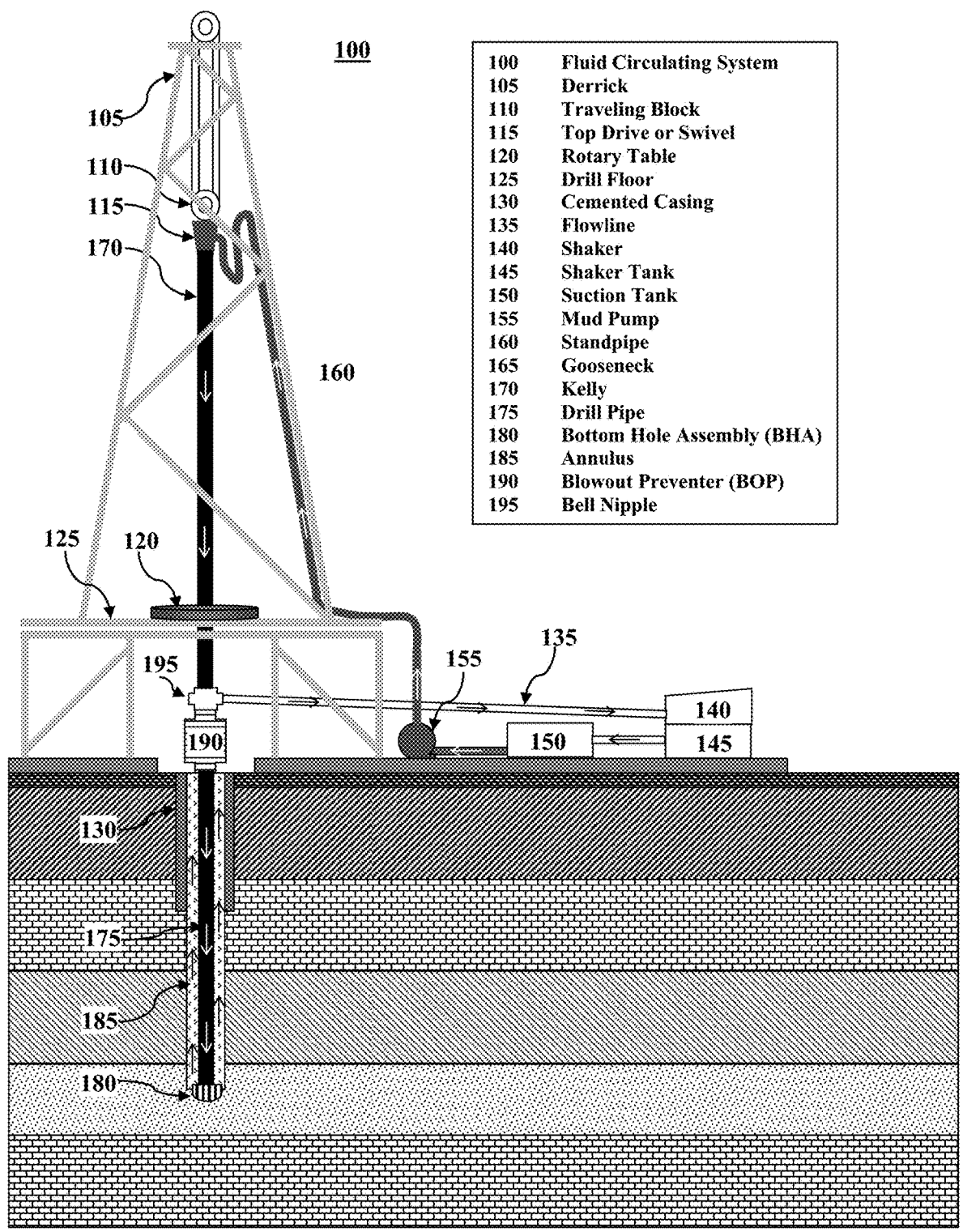
FIG. 1 is a generic fluid circulating system.

As shown in FIG. 1, a Fluid Circulating System 100, is an integral part of a drilling rig. The Derrick 105 is the structure that accommodates inserting new drillpipe into the drill string. Once a new drillpipe is added to the string, the Traveling Block 110, lowers the drillstring into the well at a specific rate to maintain an appropriate weight on bit. The Top Drive or Swivel 115 allows the drill string to rotate either through a top drive or through a Rotary Table 120 located on the Drill Floor 125. The initial outer casing is a Cemented Casing 130 to ensure stability of the well bore and provide a solid connection between the drilling operations and the ground below. The drilling fluid circulating system is fed by a Flowline 135 that takes the spent drilling fluid to a Shaker or Shale Shaker 140 where solids and drill cuttings are removed from the returned fluid. The fluid flows through into a Shaker Tank 145. The clean fluid is then transferred to a Suction Tank or Mud Tank 150. The Mud Pump 155 pumps drilling mud up the Standpipe 160 through the Gooseneck 165 and down the Kelly 170 into the Drill Pipe or Drill String 175. The Bottom Hole Assembly (BHA) 180 may contain a variety of different components but terminates with a drill bit that cuts into the formation. Drilling fluid exits the BHA and drill bit where it returns up the Annulus 185, through the Blowout Preventer (BOP) 190 to the Bell Nipple 195 where it is returned to the Flowline 135.

Figure 2:
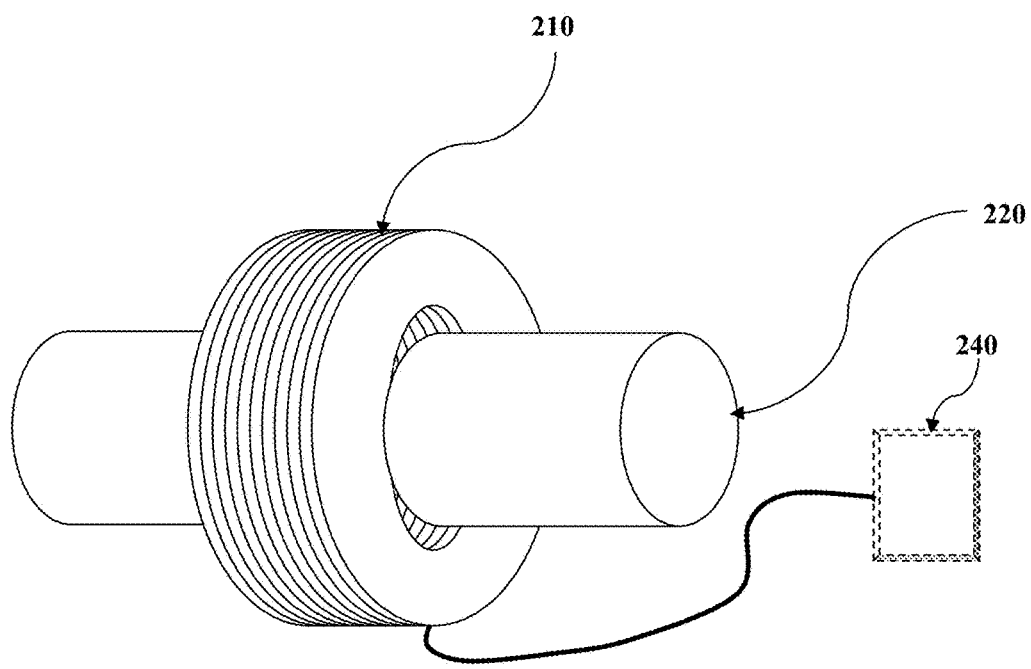
FIG. 2 is a degaussing unit for degaussing drilling fluids.

FIG. 2 shows a section of pipe 220 with a degaussing coil 210 around the pipe. The degaussing coil 210 may either be a copper coil or other ferromagnetic material. The degaussing coil may be attached to an optional controller 240.

Figure 3:
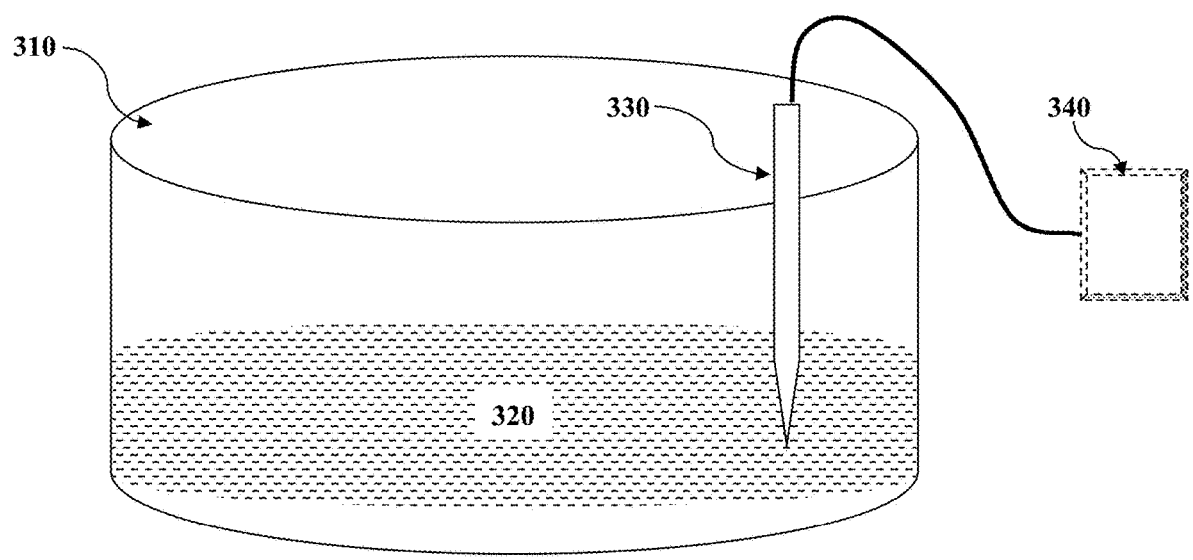
FIG. 3 is a tank containing drilling fluid with a magnetometer.

FIG. 3 show a mud tank, shaker tank or other vessel 310 containing a drilling fluid 320. A magnetometer 330 may be connected to an optional controller 340. A variety of magnetometers are available from simple handheld magnetometer to a system which uses multiple sensors.

Figure 4:
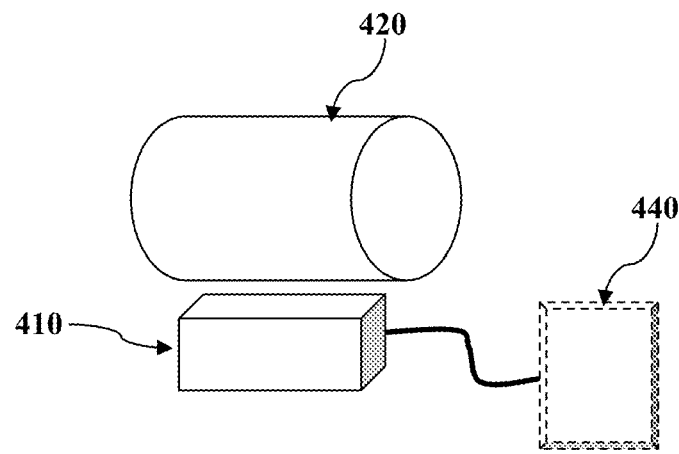
FIG. 4 is a demagnetizer for demagnetizing drilling fluids.

FIG. 4 shows a section of pipe 420 with a demagnetizer 410 under the pipe. The demagnetizer may either be a strong permanent magnet or strong electromagnet which generates a disruptive electromagnetic field. An electromagnetic material may be used that allows generation of a specific electromagnetic signal or pulse to neutralize any residual magnetism in the drilling fluid. The demagnetizer may optionally communicate with a controller 440.

Figure 5:
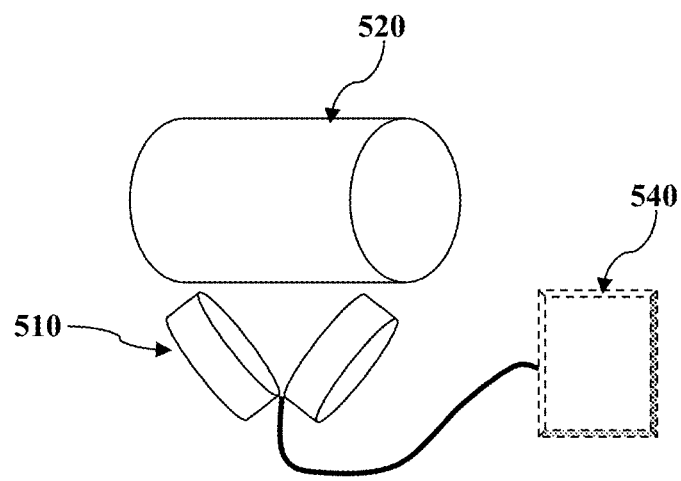
FIG. 5 is a pair of perpendicular coils for demagnetizing drilling fluids.

FIG. 5 shows a section of pipe 520 with two perpendicular degaussing coils 510 under the pipe. The degaussing coils 510 may either be a copper coil or other ferromagnetic material. The degaussing coils may be attached to an optional controller 540.

The following examples of certain embodiments of the invention are given. Each example is provided by way of explanation of the invention, one of many embodiments of the invention, and the following examples should not be read to limit, or define, the scope of the invention.

Example 1

In one embodiment, a portable magnetometer is used to periodically check the magnetic field in the drilling mud at any accessible point—typically after the shaker table where large debris and cuttings are removed. If a magnetic field is detected, a demagnetization unit either permanently or temporarily installed is used to degauss the drilling fluid for a period of time. The time for degaussing may be calculated based on flow rate and total volume, where the degaussing time used is sufficient to degauss a fraction of the total volume or the entire volume of drilling mud. If for example, the total volume were 200 barrels and the flow rate were 20 barrels per minute, the fluid would be degaussed for 5 minutes to degauss half of the drilling fluid and 10 minutes to degauss the total volume.

Example 2

In another embodiment, degaussing is conducted during a measurement period. For example, if sensitive measurement is going to be made, a temporary or permanently installed degaussing unit is used to degauss the fluid during the measurement. Typically, degaussing would be initiated prior to measurement for a period of time sufficient to deliver degaussed fluid to the measurement area.

Example 3

In yet another embodiment, degaussing is automated by installing a permanent magnetometer into one or more pieces of equipment. If a significant magnetic field is detected at one or more locations in the fluid circulation system the processor may initiate degaussing of the fluid until the magnetic field is reduced.

Example 4

In one example, a degaussing unit was connected after the mud pit tank. The fluid was degaussed for 15 minutes during a survey. Well bore quality improved 10-fold, reducing the dynamic scale factor and decreasing the cone of uncertainty by a factor of 20. It has been shown in some circumstances that degaussing the drilling fluid allows the use of less expensive tools without magnetic shielding.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. U.S. Pat. No. 9,822,595, "Methods and systems for drilling" (2017).
2. WO2015147788, "Well tools having magnetic shielding for magnetic sensor" (2015).
3. Vipulanandan, C., et al., "Smart Bentonite Drilling Muds Modified with Iron Oxide Nanoparticles and Characterized Based on the Electrical Resistivity and Rheological Properties with Varying Magnetic Field Strengths and Temperatures," Offshore Technology Conference (2017).
4. Williamson, D., "Drilling Fluid Basics," Oilfield Review Spring 2013: v. 25(1) (2013).

The invention claimed is:

1. An apparatus for demagnetizing a well fluid, said apparatus comprising:
   a) a demagnetization unit;
   b) a coupling for installing said demagnetization unit adjacent a pipe on a drilling rig between a stand pipe for inflow of a well fluid and a kelly, wherein said demagnetization unit is configured to neutralize residual magnetism in said well fluid before said well fluid is pumped into a drill string;
   c) a processor and a magnetometer configured to measure a magnetic flux of said well fluid and said processor configured to initiate said demagnetization unit to demagnetize said well fluid if a measured magnetic flux is above a threshold value.

2. The apparatus according to claim 1, wherein said demagnetization unit is an electromagnetic demagnetizer, a degausser, or a pulse degausser.

3. An apparatus for degaussing a drilling fluid, said apparatus comprising:
   a) a degausser unit and a magnetometer operatively coupled to a processor;
   b) said degausser unit configured to surround a pipe and demagnetize an inflowing drilling fluid being conveyed through said pipe to a drill bit;
   c) said magnetometer configured to measure a magnetic flux of said inflowing drilling fluid;
   d) said processor configured to initiate said degaussing unit to degauss said inflowing drilling fluid if a measured magnetic flux is above a threshold value and thereby neutralize residual magnetism in said inflowing drilling fluid.

4. The apparatus according to claim 3, wherein said apparatus is installed at a location selected from the group comprising: between a bell nipple and a shaker tank, between a mud pit and a suction tank, between said shaker tank and said suction tank, between said suction tank and a mud pump, between said mud pump and a stand pipe, between said stand pipe and a kelly, between said kelly and a top drive, within sections of a drill pipe, above a bottom hole assembly, and any combination thereof.

5. A process for obtaining one or more measurements in a well bore, comprising:
   a) identifying in advance a magnetically sensitive measurement location and a measurement time;
   b) calculating a time prior to said measurement time that is required for a volume of well fluid to reach from a demagnetizing unit to said measurement location; and
   c) installing said demagnetization unit on a pipe at a location identified in step a), said location selected from between a bell nipple and a shaker tank, between a mud pit and a suction tank, between the shaker tank and the suction tank, between the suction tank and a mud pump, between the mud pump and a stand pipe, between the stand pipe and a kelly, or between the kelly and a top drive; said demagnetization unit configured to demagnetize a well fluid in a well fluid circulation system connected to a well bore;
   d) circulating well fluid in said circulation system;
   e) demagnetizing said well fluid wherein said demagnetization unit neutralizes residual magnetism in said well fluid at said time prior; and
   e) obtaining one or more measurements in said well bore using said demagnetized well fluid.

6. A process according to claim 5, wherein said demagnetization unit is temporarily installed.

7. A process according to claim 5, wherein the demagnetizing unit is operated if the magnetic flux in said well fluid is above a threshold value.

8. A process according to claim 5, wherein said demagnetization unit comprises: a) a coil degaussing unit; and b)

a coupling for installing said demagnetization unit around a pipe in said circulation system.

9. A process according to claim 5, wherein said demagnetization unit is a permanent magnet, an electromagnetic demagnetizer, a degausser, or a pulse degausser.

10. A process according to claim 5, wherein said demagnetization unit further comprises a processor and a magnetometer, said magnetometer configured to measure a magnetic flux of said well fluid and said processor configured to initiate said demagnetization unit to demagnetize said well fluid if a measured magnetic flux in said well fluid is above a threshold value.

* * * * *